United States Patent
Shvodian et al.

(10) Patent No.: US 7,127,254 B2
(45) Date of Patent: Oct. 24, 2006

(54) METHOD OF USING SUB-RATE SLOTS IN AN ULTRAWIDE BANDWIDTH SYSTEM

(75) Inventors: William M. Shvodian, McLean, VA (US); Knut T. Odman, Vienna, VA (US); Sergio T. Montano, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 771 days.

(21) Appl. No.: 10/384,801

(22) Filed: Mar. 11, 2003

(65) Prior Publication Data

US 2003/0199272 A1 Oct. 23, 2003

Related U.S. Application Data

(66) Substitute for application No. 60/363,304, filed on Mar. 11, 2002.

(51) Int. Cl.
*H04Q 7/20* (2006.01)
*H04B 7/212* (2006.01)
*H04J 3/00* (2006.01)

(52) U.S. Cl. .................. 455/450; 455/452.1; 370/321; 370/336

(58) Field of Classification Search .............. 370/321, 370/336, 345; 455/450, 452.1
See application file for complete search history.

(56) References Cited

U.S. PATENT DOCUMENTS

| 4,530,093 | A |   | 7/1985  | Akram et al.              |
|-----------|---|---|---------|---------------------------|
| 5,638,371 | A |   | 6/1997  | Raychaudhuri et al.       |
| 5,862,132 | A | * | 1/1999  | Blanchard et al. .......... 370/342 |
| 5,870,389 | A |   | 2/1999  | Hadar et al.              |
| 6,005,856 | A |   | 12/1999 | Jensen et al.             |
| 6,081,519 | A |   | 6/2000  | Petler                    |
| 6,144,653 | A |   | 11/2000 | Persson et al.            |
| 6,160,802 | A |   | 12/2000 | Barrett                   |
| 6,212,176 | B1|   | 4/2001  | Andersson et al.          |
| 6,512,927 | B1| * | 1/2003  | Hunzinger ............... 455/452.1 |

* cited by examiner

*Primary Examiner*—Bing Q. Bui (57) ABSTRACT

A method is provided to pass information in a wireless network. The available channel time in the network is first divided into a plurality of sequential superframes. Some devices may need to transmit during every superframe, but others will only need to transmit during a fraction of the superframes. These devices are assigned sub-rate time slots in the superframes at sub-rates that must be a power of two. In other words, they can only be assigned sub-rate time slots every second superframe, every fourth superframe, every eighth superframe, etc. This allows the sub-rate time slots to be spread more evenly throughout the plurality of sequential superframes, and minimizes the amount of overlap possible.

7 Claims, 6 Drawing Sheets

METHOD OF USING SUB-RATE SLOTS IN AN ULTRAWIDE BANDWIDTH SYSTEM

CROSS-REFERENCE TO RELATED PATENT DOCUMENTS

This application relies for priority on U.S. provisional application Ser. No. 60/363,304, by William M. Shvodian et al., filed Mar. 11, 2002, entitled "A METHOD OF FORMING SUBRATE SLOTS IN A PICONET," the contents of which are hereby incorporated by reference in their entirety.

BACKGROUND OF THE INVENTION

The present invention relates to wireless personal area networks and wireless local area networks. More particularly, the present invention relates to a method for allowing data to be sent less frequently in a network without incurring to great a cost.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

Figure 1:
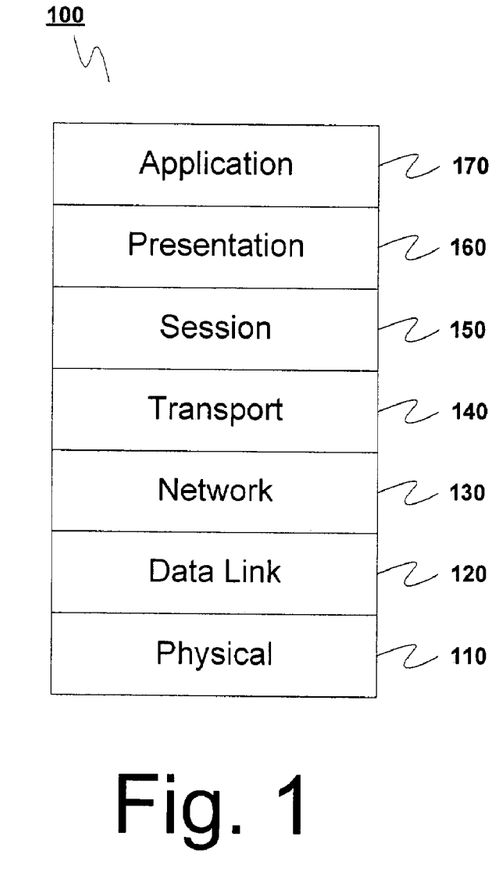
FIG. 1 is a diagram showing the hierarchy of the seven-layered OSI standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

Figure 2:
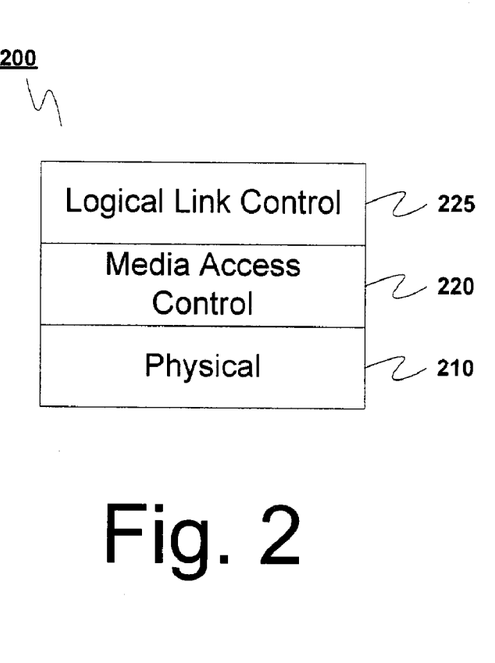
FIG. 2 is a diagram showing the IEEE 802 standard.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

Figure 3:
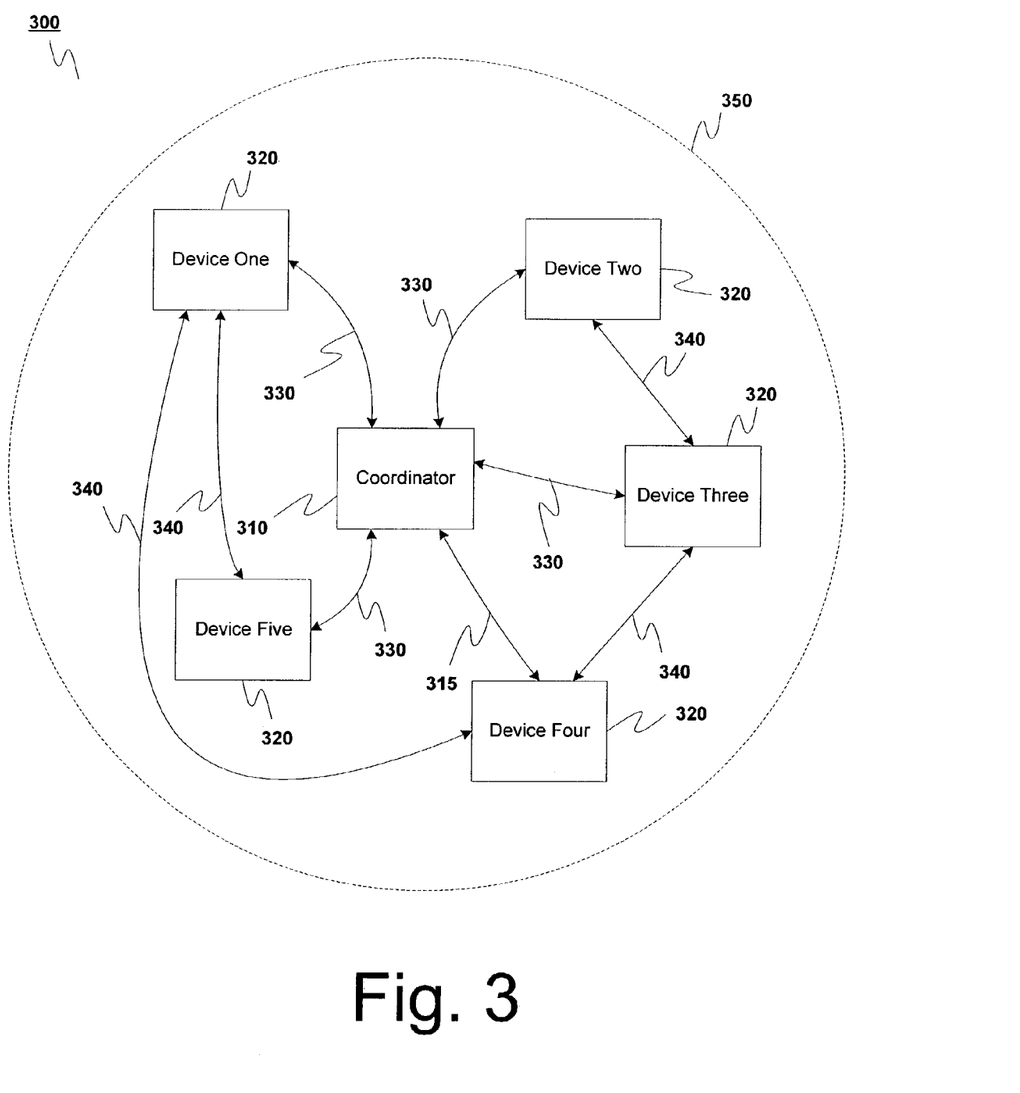
FIG. 3 is a block diagram of a wireless network according to a preferred embodiment of the present invention.

FIG. 3 is a block diagram of a wireless network 300 that could use the IEEE 802 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of non-coordinator devices 320. The coordinator 310 serves to control the operation of the network 300. As noted above, the system of coordinator 310 and non-coordinator devices 320 may be called a piconet, in which case the coordinator 310 may be referred to as a piconet coordinator (PNC). Each of the non-coordinator devices 320 must be connected to the coordinator 310 via primary wireless links 330, and may also be connected to one or more other non-coordinator devices 320 via secondary wireless links 340, also called peer-to-peer links.

In addition, although FIG. 3 shows bi-directional links between devices, they could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 320, except with the additional functionality for coordinating the system, and the requirement that it communicate with every device 320 in the network 300. In other embodiments the coordinator 310 may be a separate designated control unit that does not function as one of the devices 320.

Through the course if the following disclosure the coordinator 310 will be considered to be a device just like the non-coordinator devices 320. However, alternate embodiments could use a dedicated coordinator 310. Furthermore, individual non-coordinator devices 320 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 320 are confined to a usable physical area 350, which is set based on the extent to which the coordinator 310 can successfully communicate with each of the non-coordinator devices 320. Any non-coordinator device 320 that is able to communicate with the coordinator 310 (and vice versa) is within the usable area 350 of the network 300. As noted, however, it is not necessary for every non-coordinator device 320 in the network 300 to communicate with every other non-coordinator device 320.

Figure 4:
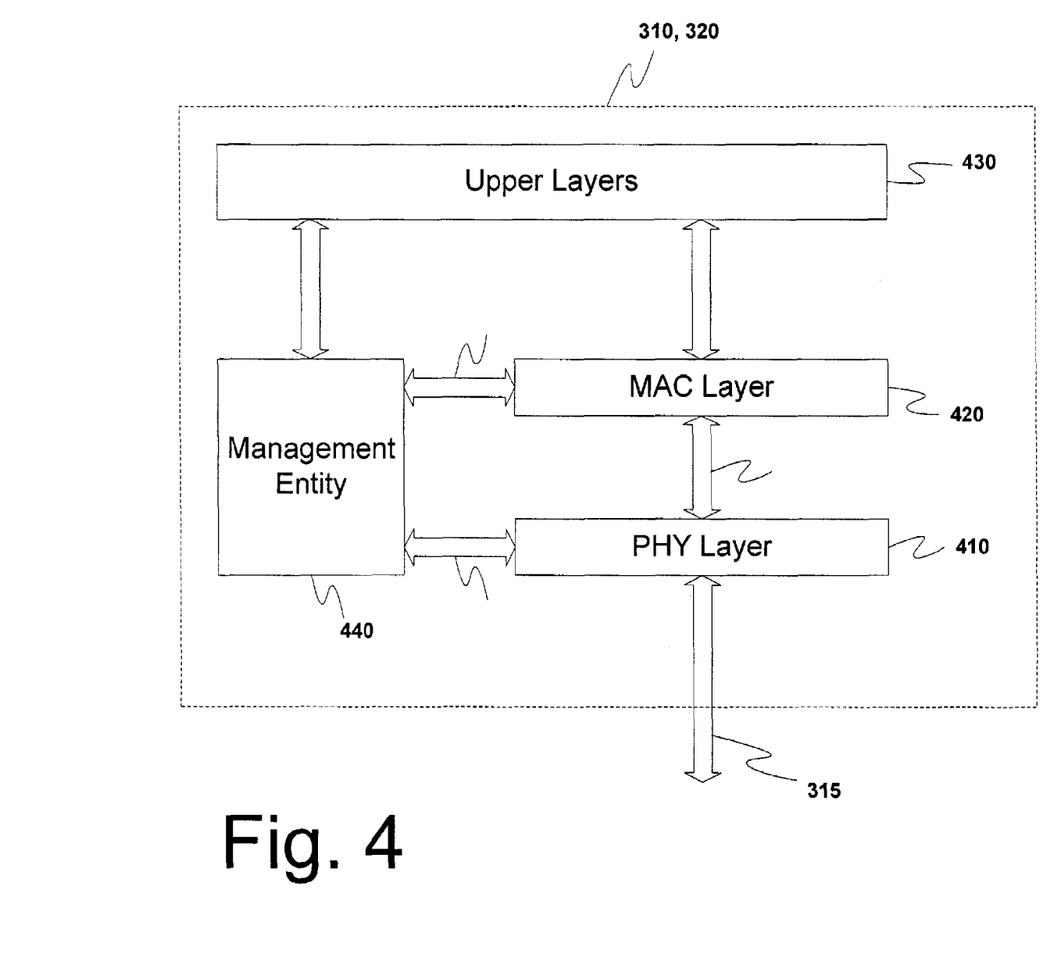
FIG. 4 is a block diagram of a device from the network of FIG. 3.

FIG. 4 is a block diagram of a device 310, 320 from the network 300 of FIG. 3. As shown in FIG. 4, each device (i.e., each coordinator 310 or non-coordinator device 320) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 430 include the functionality of the device 310, 320. These upper layers 430 may include a logical link control (LLC) or the like. The upper layers allow the MAC layer 420 to interface with various protocols, such as TCP/IP, TCP, UDP, RTP, IP, USB, 1394, UDP/IP, ATM, DV2, MPEG, or the like.

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using a form of time division multiple access (TDMA). Using this standard, the MAC layer 420 defines frames and superframes through which the sharing of the bandwidth by the devices 310, 320 is managed by the coordinator 310 and/or the non-coordinator devices 320.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

The present invention provides a method of coordinating devices 310, 320 either operating in a network 300 or trying to join a network 300 through the use of cyclic beacons inside superframes that define the data path across the network 300.

Device IDs and MAC Addresses

One important aspect of working with devices 310, 320 in a network 300 is uniquely identifying each of the devices 310, 320. There are several ways in which this can be accomplished.

Independent of any network it is in, each device 310, 320 has a unique MAC address that can be used to identify it. This MAC address is generally assigned to the device by the manufacturer such that no two devices 310, 320 have the same MAC address. One set of standards that is used in preferred embodiments of the present invention to govern MAC addresses can be found in IEEE Std. 802-1990, "IEEE Standards for Local and Metropolitan Area Networks: Overview and Architecture."

For ease of operation, the network 300 can also assign a device ID to each device 310, 320 in the network 300 to use in addition its unique MAC address. In the preferred embodiments the MAC 420 uses ad hoc device IDs to identify devices 310, 320. These device IDs can be used, for example, to route frames within the network 300 based on the ad hoc device ID of the destination of the frame. The device IDs are generally much smaller than the MAC addresses for each device 310, 320. In the preferred embodiments the device IDs are 8-bits and the MAC addresses are 48-bits.

Each device 310, 320 should maintain mapping table that maps the correspondence between device IDs and MAC addresses. The table is filled in based on the device ID and MAC address information provided to the non-coordinator devices 320 by the coordinator 310. This allows each device 310, 320 to reference themselves and the other devices in the network 300 by either device ID or MAC address.

SUMMARY OF THE INVENTION

Consistent with the title of this section, only a brief description of selected features of the present invention is now presented. A more complete description of the present invention is the subject of this entire document.

An object of the present invention is to spread out sub-rate time slots more evenly in a superframe structure, so as to minimize the possibility of overlap.

Another object of the present invention is to allow for a method in which any two devices can always be assigned sub-rate time slots in different superframes.

These and other objects are accomplished by way of a method of passing information in a wireless network. This method comprises: dividing an available channel time in the wireless network into a plurality of sequential superframes; transmitting first signals from a first device only during one out of every $K_1$ sequential superframes; and transmitting second signals from a second device only during one out of every $K_2$ sequential superframes. In this method, $K_1$ and $K_2$ are each chosen from the set consisting of powers of two. Preferably, the first and the second devices do not ever transmit signals during the same superframe.

Each superframe preferably has a limited number of sub-rate time slots, and the first and second signals are transmitted in these sub-rate time slots.

A method is also provided of passing information in a wireless network. This method comprises: dividing an available channel time in the wireless network into a plurality of sequential superframes; and transmitting first through $N^{th}$ signals from first through $N^{th}$ devices, respectively, only during one out of every $K_1$ to $K_N$ sequential superframes, respectively. In this method, $K_1$ to $K_N$ are each integers chosen from the set consisting of powers of two. When $$\frac{1}{K_1} + \frac{1}{K_2} + \cdots + \frac{1}{K_N} < 1,$$

it is preferable that no two of the first through $N^{th}$ devices transmit signals during the same superframe. When $$\frac{1}{K_1} + \frac{1}{K_2} + \cdots + \frac{1}{K_N} < J,$$

it is preferable that no more than $J$ of the first through $N^{th}$ devices transmit signals during the same superframe. In this case $J$ is an integer greater than 1.

Each superframe preferably has a limited number of sub-rate time slots, and the first through $N^{th}$ signals are preferably transmitted in the sub-rate time slots.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which.

DETAILED DESCRIPTION OF THE PREFERRED EMBODIMENTS

Preferred embodiments of the present invention will now be described with reference to the drawings. Throughout the several views, like reference numerals designate identical or corresponding parts.

Superframes

The available bandwidth in a given network 300 is split up in time by the coordinator 310 into a series of repeated superframes. These superframes define how the available transmission time is split up among various tasks. Individual frames of data are then transferred within these superframes in accordance with the timing set forth in the superframe.

Figure 5:
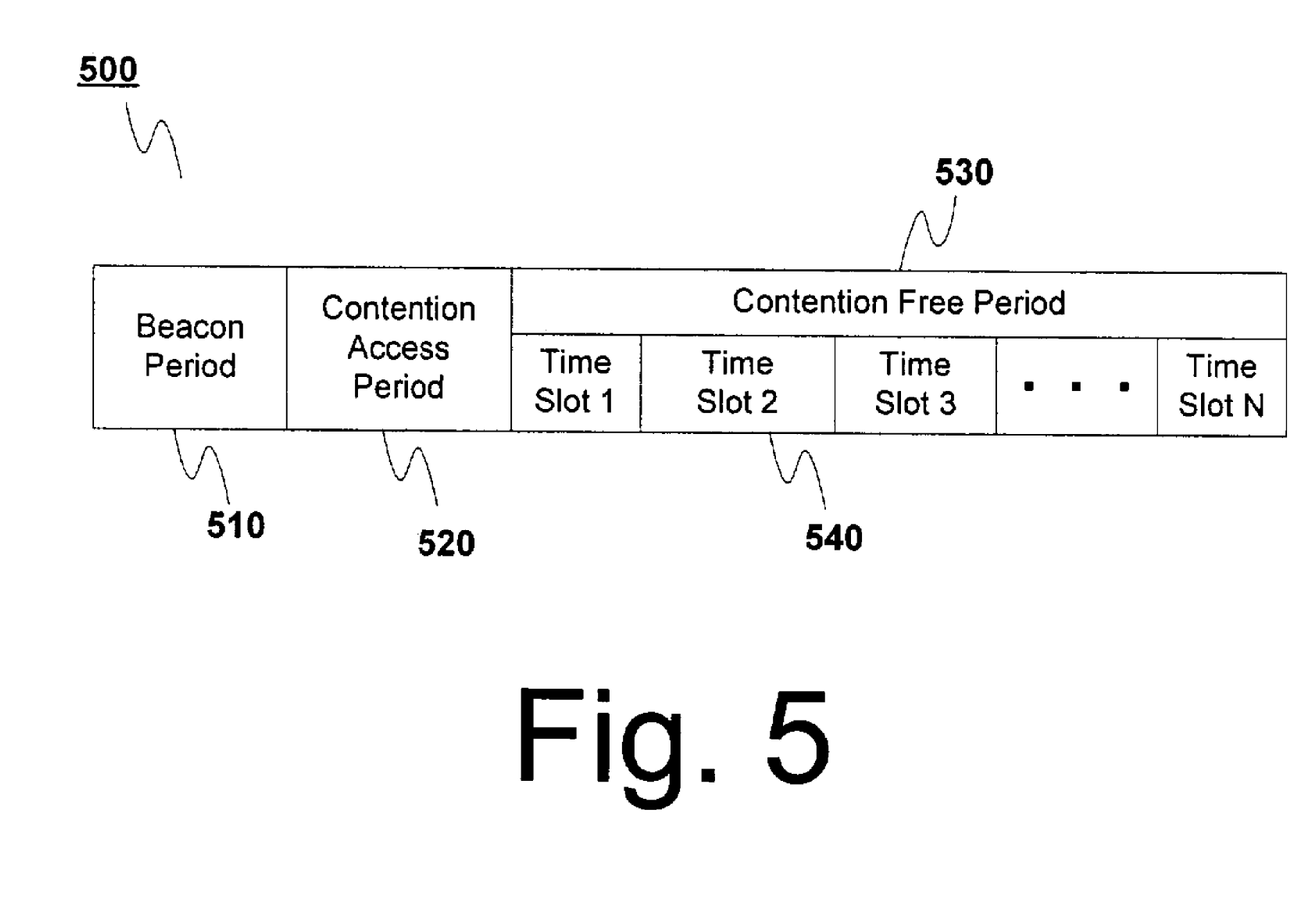
FIG. 5 is a block diagram of a superframe according to preferred embodiments of the present invention.

FIG. 5 is a block diagram of a superframe according to preferred embodiments of the present invention. As shown in FIG. 5, each superframe 500 may include a beacon period 510, a contention access period (CAP) 520, and a contention free period (CFP) 530.

The beacon period 510 is set aside for the coordinator 310 to send a beacon frame out to the non-coordinator devices 320 in the network 300. Such a beacon frame will include information for organizing the operation of devices within the superframe. Each non-coordinator device 320 knows how to recognize a beacon 510 prior to joining the network 300, and uses the beacon 510 both to identify an existing network 300 and to coordinate communication within the network 300.

The CAP 520 is used to transmit commands or asynchronous data across the network. The CAP 520 may be eliminated in many embodiments and the system would then pass commands solely during the CFP 530.

The CFP 530 includes a plurality of time slots 540. These time slots 540 are assigned by the coordinator 310 to a single transmitting device 310, 320 and one or more receiving devices 310, 320 for transmission of information between them. Generally each time slot 540 is assigned to a specific transmitter-receiver pair, though in some cases a single transmitter will transmit to multiple receivers at the same time. Exemplary types of time slots are: management time slots (MTS) and guaranteed time slots (GTS).

An MTS is a time slot that is used for transmitting administrative information between the coordinator 310 and one of the non-coordinator devices 320. As such it must have the coordinator 310 be one member of the transmission pair. An MTS may be further defined as an uplink MTS (UMTS) if the coordinator 310 is the receiving device, or a downlink MTS (DMTS) if the coordinator 310 is the transmitting device.

A GTS is a time slot that is used for transmitting isochronous non-administrative data between devices 310, 320 in the network 300. This can include data transmitted between two non-coordinator devices 320, or non-administrative data transmitted between the coordinator 310 and a non-coordinator device 320.

As used in this application, a stream is a communication between a source device and one or more destination devices. The source and destination devices can be any devices 310, 320 in the network 300. For streams to multiple destinations, the destination devices can be all or some of the devices 310, 320 in the network 300.

In some embodiments the uplink MTS may be positioned at the front of the CFP 530 and the downlink MTS positioned at the end of the CFP 530 to give the coordinator 310 a chance to respond to an uplink MTS in the in the downlink MTS of the same superframe 500. However, it is not required that the coordinator 310 respond to a request in the same superframe 500. The coordinator 310 may instead respond in another downlink MTS assigned to that non-coordinator device 320 in a later superframe 500.

The superframe 500 is a fixed time construct that is repeated in time. The specific duration of the superframe 500 is described in the beacon 510. In fact, the beacon 510 generally includes information regarding how often the beacon 510 is repeated, which effectively corresponds to the duration of the superframe 500. The beacon 510 also contains information regarding the network 300, such as the identity of the transmitter and receiver of each time slot 540, and the identity of the coordinator 310.

The system clock for the network 300 is preferably synchronized through the generation and reception of the beacons 510. Each non-coordinator device 320 will store a synchronization point time upon successful reception of a valid beacon 510, and will then use this synchronization point time to adjust its own timing.

Although not shown in FIG. 5, there are preferably guard times interspersed between time slots 540 in a CFP 530. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required is preferably based primarily on the clock accuracy and the duration since the previous synchronization event. Such a synchronizing event will generally occur when a non-coordinator device 320 successfully receives a beacon frame from the coordinator 310.

For simplicity, a single guard time value may be used for the entire superframe. The guard time will preferably be placed at the end of each beacon frame, GTS, and MTS.

Figure 6:
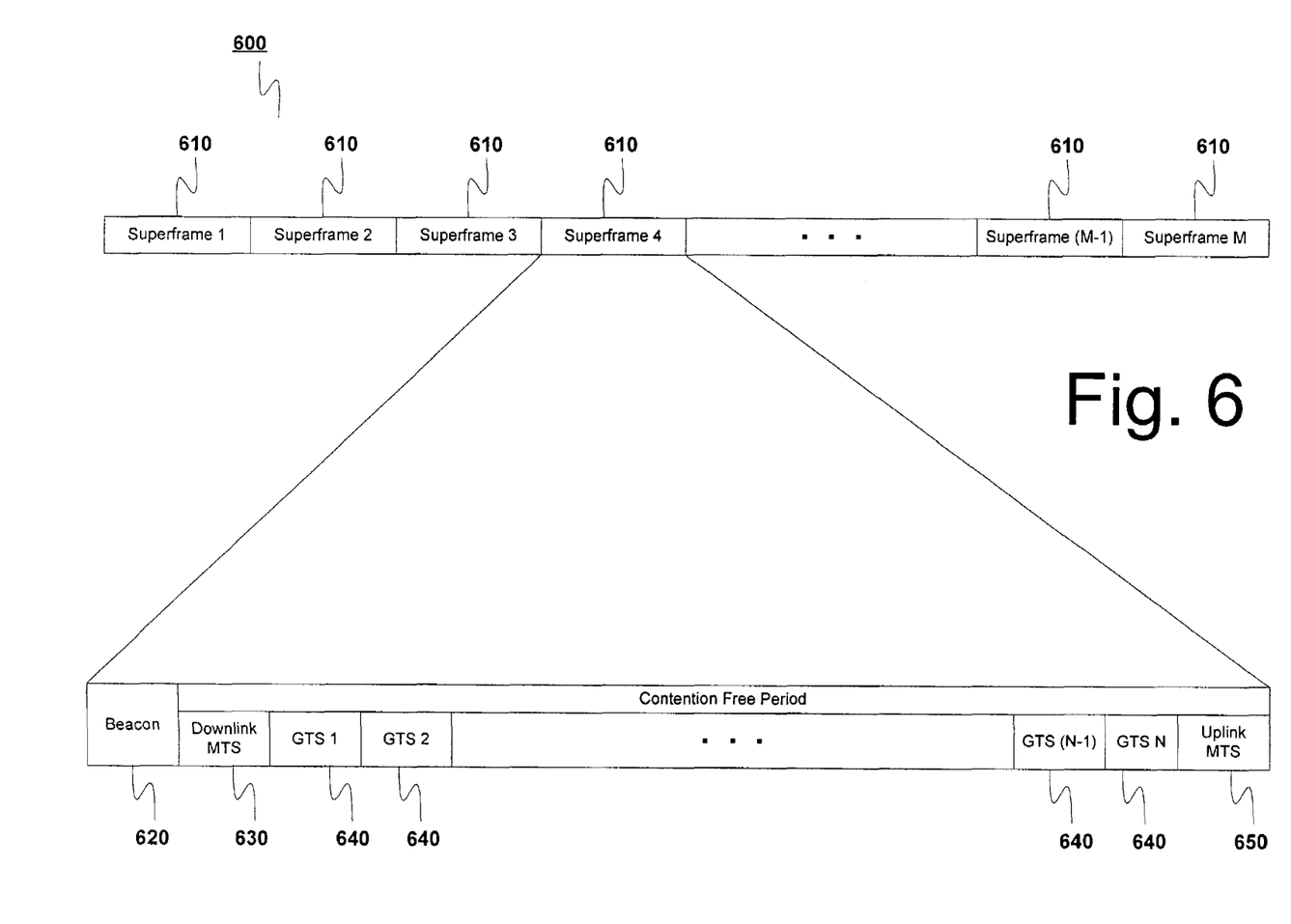
FIG. 6 is a block diagram of a specific superframe design according to a preferred embodiment of the present invention.

The exact design of a superframe 500 can vary according to implementation. FIG. 6 shows an example of a specific superframe design. As shown in FIG. 6, the transmission scheme 600 involves dividing the available transmission time into a plurality of superframes 610. Each individual superframe 610 includes a beacon frame 620, an uplink MTS 630, a plurality of GTS 640, and a downlink MTS 650. This exemplary superframe includes no contention access period.

The beacon frame 620 indicates by association ID (known as a device ID in the IEEE 802.15.3 draft standard) a non-coordinator device 320 that is assigned to the current superframe 610. It also indicates via a receive-transmit table the transmitter/receiver assignments for the individual GTS 640.

In the exemplary superframe structure shown in FIG. 6, the uplink MTS 630 is set aside for the non-coordinator device 320 assigned to the current superframe 610 to upload signals to the coordinator 310. All other non-coordinator devices 320 remain silent on the current channel during this time slot. In alternate embodiments that use multiple channels, all other stations on that channel must remain silent during an uplink MTS 630, though they may still transmit on alternate channels.

The plurality of GTS 640 are the time slots set aside for each of the devices 310, 320 to allow communication between devices. They do so in accordance with the information set forth in the receive-transmit table in the beacon 620. Each GTS 640 is preferably large enough to transmit one or more data frames. When a transmitter-receiver set is assigned multiple GTS 640, they are preferably contiguous.

The downlink MTS 650 is set aside for the coordinator 310 to download signals to the non-coordinator device 320 assigned to the current superframe 610. All other non-coordinator devices 320 may ignore all transmissions during this time slot.

The lengths of the uplink and downlink MTS 630 and 650 must be chosen to handle the largest possible management frame, an immediate acknowledgement (ACK) frame, and the receiver-transmitter turnaround time. The GTS 640, the length and number must be chosen to accommodate the specific requirements of frames to be transmitted, e.g., short MPEG frames, large frames of the maximum allowable length, and the ACK policy used.

Although the disclosed embodiment uses one uplink MTS 630 placed before a plurality of GTS 640, and one downlink MTS 650 placed after a plurality of GTS 640, the number, distribution, and placement of MTS 630, 650 and GTS 640 may be varied in alternate embodiments.

However, such a TDMA protocol in general has no support for asynchronous data. A system is forced to use a static stream connection for the passing of asynchronous data, which leads to a large signal overhead, or to provide an asynchonous period (e.g., a CAP 520) that uses a contention access protocol like carrier sense multiple access/ collision avoidance (CSMA/CA), which leads to performance degradation and to power usage increase The power consumption is increased because every device 310, 320 must remain powered up during the CAP 520 (i.e., none of the devices 310, 320 can enter a power-saving sleep mode). The performance is degraded because there is less certainty of a given data frame being transmitted at any given time.

Channel Time Allocations

Each device 310, 320 that desires to send data will be assigned one or more time slots 540 to pass that information. This time slot assignment can be referred to as a channel time allocation (CTA), since it represents the amount of time that the device 310, 320 is provided.

Sometimes, a device 310, 320 will have a CTA that requires that it be assigned a time slot 540 in each superframe 500, 610. This may result because the data passed by the device 310, 320 will not allow delay. Or it may simply result because of light traffic passing through the network 300.

Sub-Rate Time Slots

Sometimes, a device 310, 320 will have a CTA that requires that it be assigned a time slot 540 less frequently than every superframe 500. Such a time slot can be referred to as a sub-rate time slot, with the sub-rate being the frequency with which the device is assigned a time slot. Preferably this frequency will be a fixed frequency, e.g., every $2^{nd}$ superframe, every $5^{th}$ superframe, every $27^{th}$ superframe, etc. In alternate embodiments a more complex periodic pattern could be used, e.g., periodic time slot—skip three superframes—periodic time slot—skip two superframes, pattern repeats. In theory, any periodic pattern of sub-rate time slots is possible.

However, if there is absolute freedom to choose any sub-rate, then the coordinator 310 of the network 300 will have to calculate complex subrate assignments, which may result in innefficient use of the available channel time. While this is good for the flexibility of the network 300, that flexibility comes at a cost. For example, as the number of sub-rate time slots increases, it becomes increasingly difficult for the coordinator 310 to fit them all together and to predict what space it will have available in a given superframe to accommodate other channel time requests.

In addition, when sub-rate slots are used, the number of active slots in a given superframe 500, 610 can then vary widely, from zero up to the total number of devices using sub-rate slots, if the wrong combination of sub-rates is chosen. For example, if all sub-rates are different prime numbers, then any two sub-rate time slots would only occur in the same superframe 500, 620 once every number of superframes equal to the product of their sub-rate periods (e.g., if one device had a sub-rate period of 3 and another had a sub-rate period of 5, it would only be every 15 superframes 500, 610 that they would both be assigned a time slot in the same superframe 500, 610). Furthermore, in such an embodiment, more overlap will occur at increasing intervals until all of the sub-rate time slots will appear in a single superframe at a period equal to the product of all of the rates.

Overlap can be a problem because when overlap occurs it could crowd out devices that need more regular time slots. The more time in a superframe that is devoted to sub-rate time slots, the less time will be available for other time slots. And some devices (particularly streaming media devices) require very regular time slots. This problem is particularly troubling because while there will be many superframes with overlap, there will also be superframes with no sub-rate time slots assigned. It would be more preferable to spread the sub-rate slots out more evenly among the superframes 500.

Figure 7:
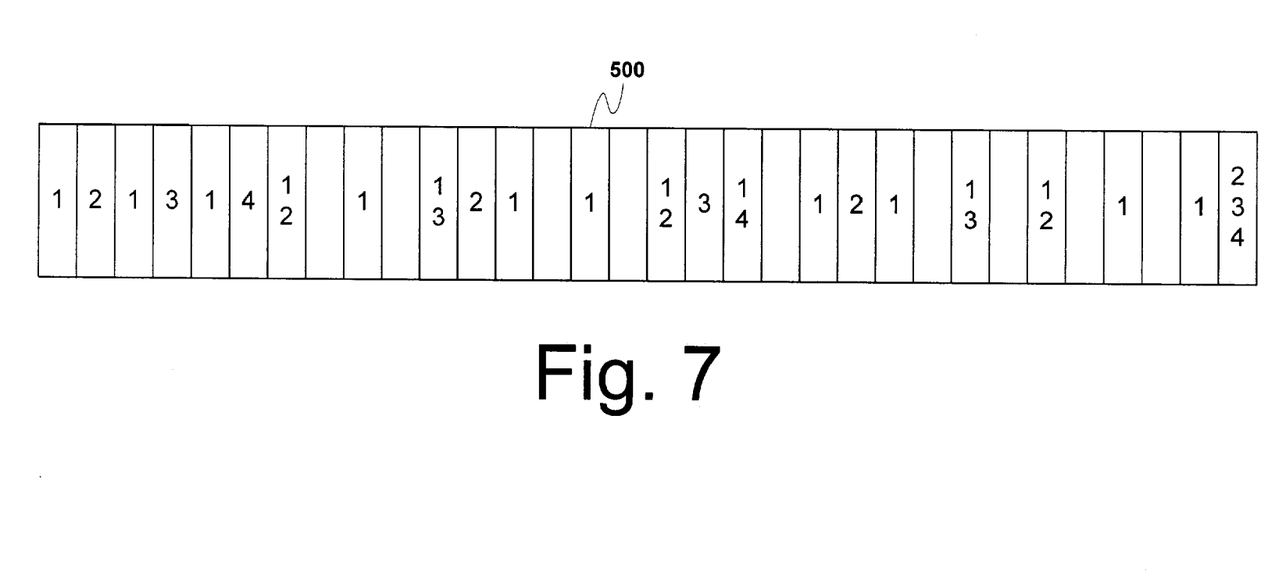
FIG. 7 is a block diagram showing a sub-rate time slot assignment for four devices using unique prime sub-rates.

FIG. 7 is a block diagram showing a sub-rate time slot assignment for four devices using unique prime sub-rates. As shown in FIG. 7, four devices have sub-rate slots assigned in a series of superframes 500. A first device has a sub-rate of 2 (i.e., every $2^{nd}$ time slot); a second device has a sub-rate of 5 (i.e., every $5^{th}$ time slot); a third device has a sub-rate of 7 (i.e., every $7^{th}$ time slot); and a fourth device has a sub-rate of 13 (i.e., every $13^{th}$ time slot). FIG. 7 lists the number of the devices assigned sub-rate slots in each superframe 500. The devices are spread out to begin with, each being assigned to the first empty superframe in the progression after the previous devices are assigned.

FIG. 7 shows 32 superframes 500 within a series of superframes 500. Within these 32 superframes, 31 sub-rate time slots are assigned, i.e., just fewer than one per superframe. Device numbers are shown inside the superframes to indicate which devices are assigned sub-rate slots in those superframes 500.

In an ideal distribution, 31 superframes 500 would have one sub-rate time slot, and one superframe would no sub-rate time slot. But as FIG. 7 shows, nine superframes 500 don't have any sub-rate time slots assigned to them, six superframes 500 have two sub-rate time slots, and one superframe 500 has three sub-rate time slots.

Overlap can also be a particular problem in embodiments that set aside a specific amount of time in each superframe for sub-rate slots. If there is a great deal of possible overlap, then the assigned sub-rate time must be assigned to cover the worst-case situation. This could cause the amount of a superframe assigned to sub-rate slots to be too large, wasting available channel time, and slowing down the system.

Furthermore, every time the CTA for a superframe 500, 610 (i.e., the assignment and placement of time slots 540) changes, the coordinator must include that new CTA information in the beacon. 510. If the CTA changes frequently, then the coordinator 310 will have to repeatedly generate new CTA information, using time and resources for this.

Power of 2 Sub-Rates

One way to reduce this complexity of a sub-rate time slot system is to limit the available sub-rates to a subset of possible values. This has the effect of simplifying the complexity of the coordinator 310 since it is limited to a reasonable number of possible beacon channel time allocations (CTAs).

It is preferable when choosing sub-rates to choose a subset of possible sub-rates that will efficiently spread out the assigned time slots within multiple superframes. For example, in the preferred embodiment they are limited to powers of 2 (i.e., 2, 4, 8, . . . ) In other words, a device could have be assigned a time slot every $2^{nd}$ superframe, every $4^{th}$ superframe, every $8^{th}$ superframe, etc., but not every $3^{rd}$ superframe or every $6^{th}$ superframe.

By limiting the number of possible sub-rates, the system enables a finite number of CTAs to be pre-calculated by the coordinator 320, rather than requiring it to constantly recalculate CTAs. This will reduce the amount of overhead required for controlling the superframes.

In addition, even though the allocated channel time will not be perfect, it will always be within a factor of 2 of the required channel time. This is because if an allocated channel time were ever farther than that from the required channel time, the coordinator 310 could always reduce the channel time allocated to sub-rate slots by a power of 2.

Another of using only powers of 2 for sub-rates is that the beacon CTA information repeats after maximum of $N_R$ superframes, where $N_R$ is the length of the highest sub-rate. In other words, the CTA cycle repeat itself after the least frequent sub-rate slot is sent (e.g., if a network has four devices using sub-rates of 4, 4, 8, and 16, the CTA cycle will repeat itself every 16 superframes). This limits the amount of effort the coordinator 310 must make in generating CTA information.

If the rates were not limited to powers of 2, the beacon cycle would repeat only a number of superframes equal to the product of the lowest common denominators of all the sub-rates. If the sub-rates were all prime numbers, the repetition cycle for CTA would be the product of all of the sub-rates.

Furthermore, by using powers of 2, sub-rate slots can be spread out more easily to avoid placing too many sub-rate slots in a given superframe 500, 610. This will limit the number of superframes 500 that have more than an average number of sub-rate slots and the number of superframes 500 that have lower than the average number of (down to zero) sub-rate slots.

In particular, as long as the sum of the inverses of the sub-rates is not greater than 1, the sub-rate slots can be spread out so that no superframe 500 receives more than one sub-rate time slot. As the sum of the inverses increases beyond 1, the minimum number of sub-rate time slots per superframe likewise increases, but still allows a very even spread.

Figure 8:
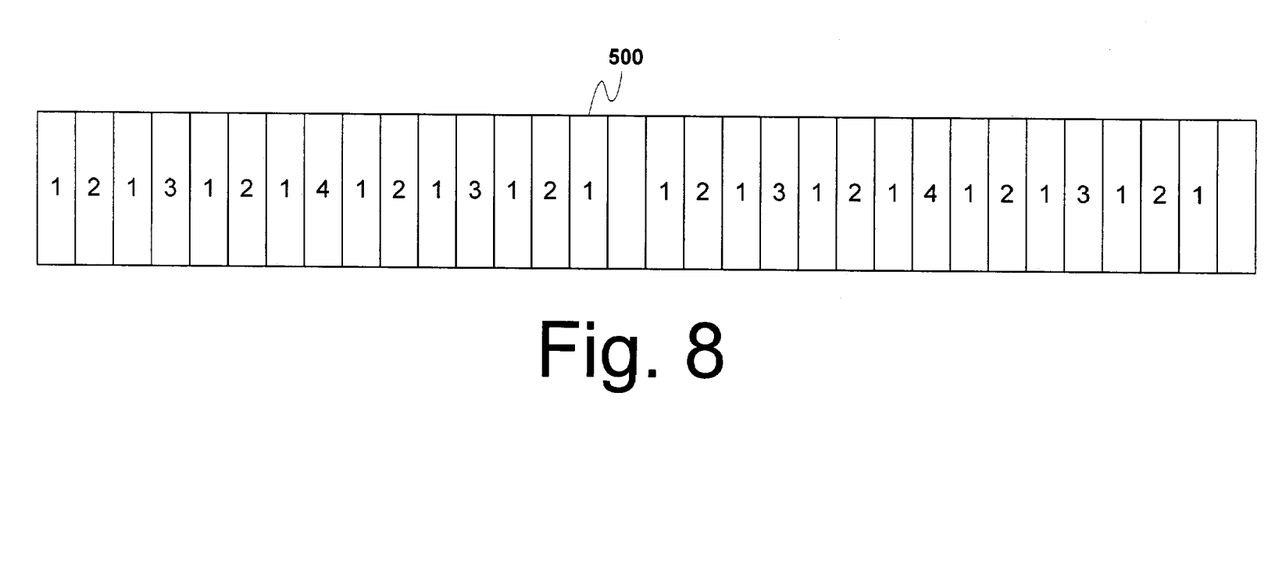
FIG. 8 is a block diagram showing a sub-rate time slot assignment for four devices using power-of-2 sub-rates, according to a preferred embodiment of the present invention.

FIG. 8 is a block diagram showing a sub-rate time slot assignment for four devices using power-of-2 sub-rates, according to a preferred embodiment of the present invention. As shown in FIG. 8, four devices have sub-rate slots assigned in a series of superframes 500. A first device has a sub-rate of 2 (i.e., every $2^{nd}$ time slot); a second device has a sub-rate of 4 (i.e., every $4^{th}$ time slot); a third device has a sub-rate of 8 (i.e., every $8^{th}$ time slot); and a fourth device has a sub-rate of 16 (i.e., every $16^{th}$ time slot). FIG. 8 lists the number of the devices assigned sub-rate slots in each superframe 500. In this embodiment the devices are spread out to begin with, each being assigned to the first empty superframe in the progression after the previous devices are assigned.

FIG. 8 shows 32 superframes 500 within a series of superframes 500. Within these 32 superframes, 30 sub-rate time slots are assigned, i.e., just fewer than one per superframe. Device numbers are shown inside the superframes to indicate which devices are assigned sub-rate slots in those superframes 500.

As shown in FIG. 8, the plurality of superframes 500 each contain a single sub-rate time slot assigned to one of the four devices (allowing the remaining time slots in that superframe to be assigned to devices that receive a time slot every superframe). Because the sum of the inverses of their sub-rates is not greater than $$\left(i.e., \frac{1}{2} + \frac{1}{4} + \frac{1}{8} = \frac{7}{8} < 1\right),$$

they can be spread out so that they do not overlap.

Furthermore, in this embodiment any two sub-rate slots can be made to not occur in the same superframe. The most frequently the first of these two sub-rate slots can be is every other superframe (i.e., a sub-rate of 2). This leaves the alternate every-other superframe open (for cases when the second sub-rate is also 2), which also means that in those alternate slots every fourth slot, every eighth slot, etc. are also free (for cases when the second sub-rate is 4, 8, etc.).

Alternate embodiments could choose a different subset of allowable sub-rates. Although using something other than just powers of 2 will not gain all of the advantages listed above, limiting the allowable sub-rates in any way will limit the complexity of CTA operations to some degree, which can be an advantage.

Synchronous Power Save Assignments

This method can also be used to coordinate superframes for a synchronous power save (SPS) system. In an SPS system, devices 320 are allowed to power down for periodic superframes.

Each device 320 participating in the SPS system will only be assigned time slots, and will only receive management information during a sub-set of the available superframes. Since during a superframe not assigned to it, a device will not have any time slots to transmit or receive in, and will not receive any management information, it need not listen or transmit anything. As a result, it can move to a reduced power mode during this time to limit power consumption.

Because a device 320 that uses SPS can only be contacted during a timeslot one of its awake superframes, it is preferable that a network 300 using SPS limit the number of SPS devices 320 that are awake during any given superframe 500. If too many SPS devices are awake in a one superframe 500, they may need an inordinate amount of the channel time, which can cause problems with devices that are more needful of time slots in every superframe (e.g., streaming media).

The assignment of awake superframes in this embodiment is analogous to the assignment of sub-rate slots in the examples above. Each device 320 that participates in the SPS system will be assigned a periodic superframe 500 in which it will be awake (e.g., an awake interval of 4 would mean that the device were awake every $4^{th}$ superframe). During other superframes 500, it will go into a power-saving sleep mode.

If any number were allowed for the awake interval (i.e., how often the device 320 is awake during a superframe), then the network 300 would run into some of the problems noted above with respect to FIG. 7. During some intervals too many devices would be awake at the same time, while in others all SPS devices would be asleep.

If the awake interval for each device 320 was limited to powers-of-two, however, then the distribution of awake superframes would be distributed more evenly, as shown for example, in FIG. 8.

As with sub-rate time slots, if the sum of the inverses of the awake intervals is not greater than 1, the awake superframes can be spread out so that no superframe 500 has more than one SPS device awake at the same time. As the sum of the inverses increases beyond 1, the minimum number of devices awake per superframe likewise increases, but still allows a very even spread.

Furthermore, in this embodiment any two devices can be made to not be awake in the same superframe 500. The most frequently the first of these two devices can be awake is every other superframe (i.e., a first awake interval of 2). This leaves the alternate superframe open (for cases where the second awake interval is also 2), which also means that in those alternate superframes, every fourth superframe, every eighth superframe, etc. are also free (for cases where the second awake interval is 4, 8, etc.).

The present invention can be used with the IEEE 803.15.3 standard for high-rate WPANs, which is currently under development by the IEEE 802.15 WPAN™ Task Group 3 (TG3). The details of the current draft 802.15.3 standard, including archives of the 802.15.3 working group can be found at: http://www.ieee802.org/15/pub/TG3.html. Nothing in this disclosure should be considered to be incompatible with the draft 802.15.3 standard, as set forth on the IEEE 802 LAN/MAN Standards Committee web page.

Obviously, numerous modifications and variations of the present invention are possible in light of the above teachings. It is therefore to be understood that within the scope of the appended claims, the invention may be practiced otherwise than as specifically described herein.

We claim:

1. A method of passing information in a wireless network, comprising:
dividing an available channel time in the wireless network into a plurality of sequential superframes;
transmitting first signals from a first device only during one out of every $K_1$ sequential superframes; and
transmitting second signals from a second device only during one out of every $K_2$ sequential superframes,
wherein $K_1$ and $K_2$ are each chosen from the set consisting of powers of two.

2. A method of passing information in a wireless network, as recited in claim 1, wherein the first and the second devices do not ever transmit signals during the same superframe.

3. A method of passing information in a wireless network, as recited in claim 1,
wherein each superframe has a limited number of sub-rate time slots, and
wherein the first and second signals are transmitted in the sub-rate time slots.

4. A method of passing information in a wireless network, comprising:
dividing an available channel time in the wireless network into a plurality of sequential superframes; and
transmitting first through $N^{th}$ signals from first through $N^{th}$ devices, respectively, only during one out of every $K_1$ to $K_N$ sequential superframes, respectively,
wherein $K_1$ to $K_N$ are each integers chosen from the set consisting of powers of two.

5. A method of passing information in a wireless network, as recited in claim 4,
wherein $$\frac{1}{K_1} + \frac{1}{K_2} + \cdots + \frac{1}{K_N} < 1,$$

and
wherein no two of the first through $N^{th}$ devices transmit signals during the same superframe.

6. A method of passing information in a wireless network, as recited in claim 4,
wherein $$\frac{1}{K_1} + \frac{1}{K_2} + \cdots + \frac{1}{K_N} < J,$$

and
wherein no more than J of the first through $N^{th}$ devices transmit signals during the same superframe, and
wherein J is an integer greater than 1.

7. A method of passing information in a wireless network, as recited in claim 4,
wherein each superframe has a limited number of sub-rate time slots, and
wherein the first through $N^{th}$ signals are transmitted in the sub-rate time slots.

* * * * *